United States Patent [19]

Yamasaki

[11] Patent Number: 5,138,360
[45] Date of Patent: Aug. 11, 1992

[54] CAMERA FOCUS DETECTOR

[75] Inventor: Masafumi Yamasaki, Hachioji, Japan

[73] Assignee: Olympus Optical Co., Ltd., Tokyo, Japan

[21] Appl. No.: 628,562

[22] Filed: Dec. 17, 1990

[30] Foreign Application Priority Data

Dec. 26, 1989 [JP] Japan .................. 1-337023

[51] Int. Cl.⁵ .............................. G03B 13/36
[52] U.S. Cl. ...................... 354/407; 354/402
[58] Field of Search ........... 354/402, 406, 407, 408

[56] References Cited

U.S. PATENT DOCUMENTS

| 4,264,810 | 4/1981 | Utagawa et al. | 354/406 |
| 4,560,863 | 12/1985 | Matsumura et al. | 354/407 |
| 4,563,576 | 1/1986 | Matsumura et al. | 354/406 |
| 4,748,321 | 5/1988 | Ishida et al. | 354/406 |
| 4,768,052 | 8/1988 | Hamada et al. | 354/402 |
| 4,904,854 | 2/1990 | Ishida et al. | |

Primary Examiner—Russell E. Adams
Attorney, Agent, or Firm—Frishauf, Holtz, Goodman & Woodward

[57] ABSTRACT

A camera focus detector employs an array of photoelectric converting elements arranged in correspondence to a plurality of regions of a photographic frame. Focus-detecting signals are obtained by processing signals output from the photoelectric converting elements. A ROM stores those focus-detecting signals which correspond to at least two regions and which are obtained when the distance to a subject has a predetermined relationship with the letting state of a photographing lens. The focus-detecting signals corresponding to arbitrary regions of the photographic frame are corrected, using the data read out of the ROM. The photographing lens is driven to its focusing position on the basis of the corrected focus-detecting signals.

16 Claims, 6 Drawing Sheets

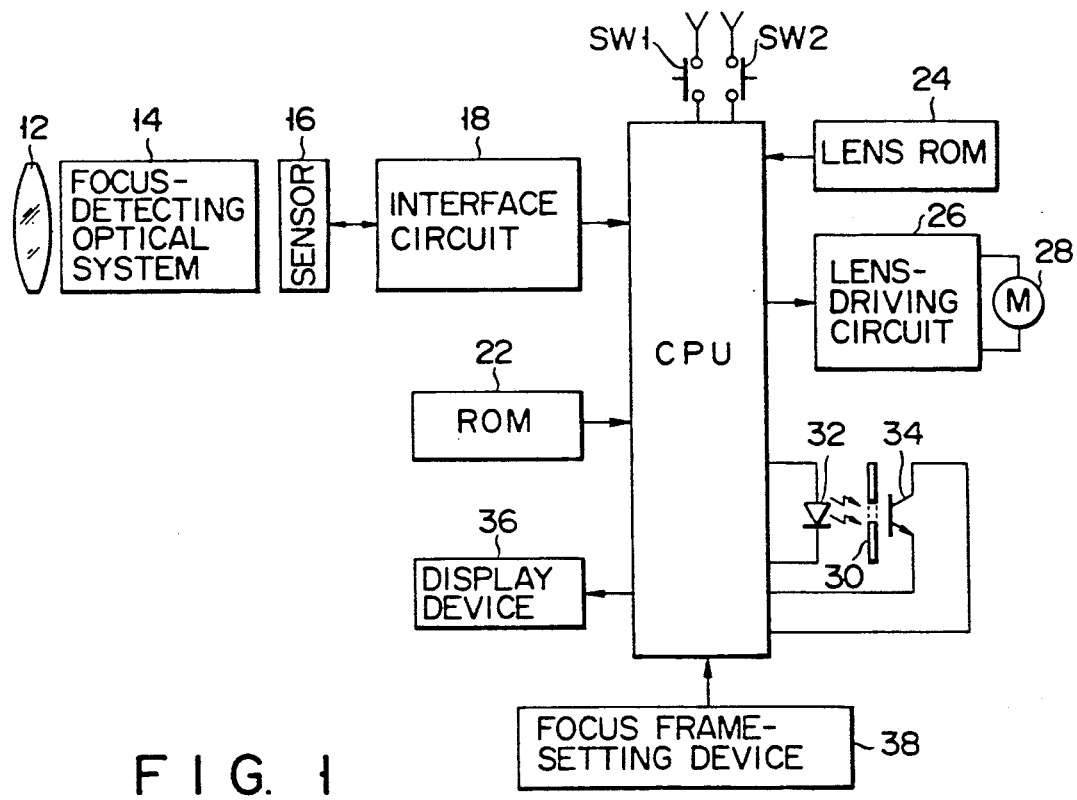
F I G. 1
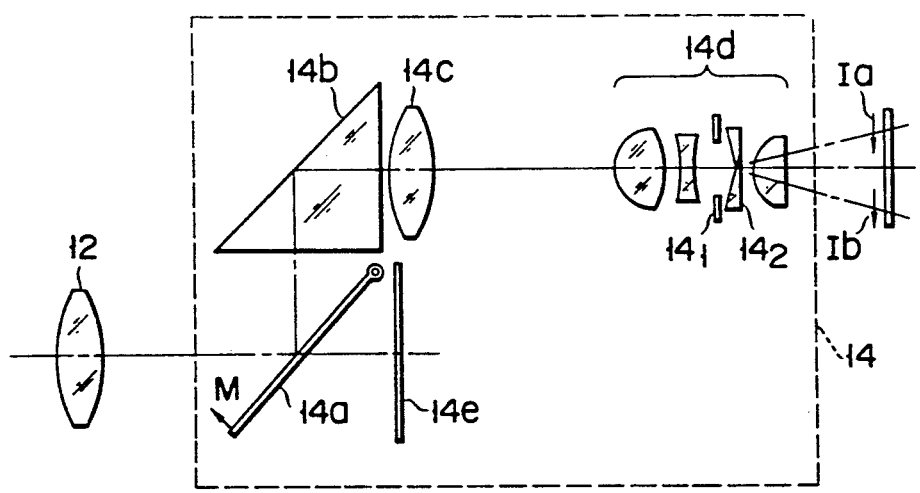
F I G. 2

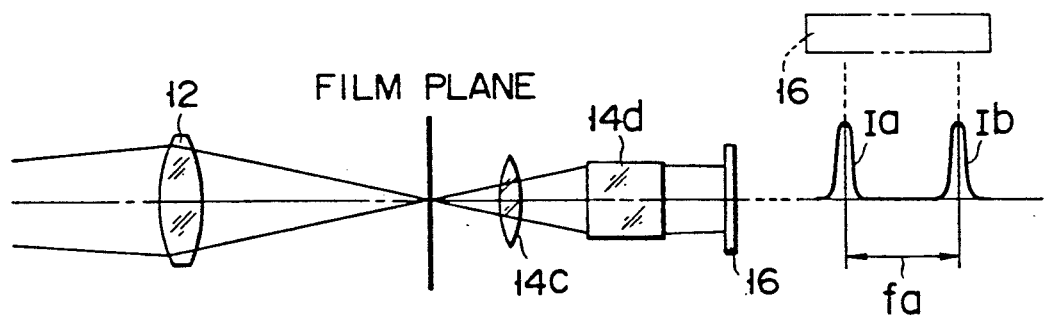
F I G. 3A
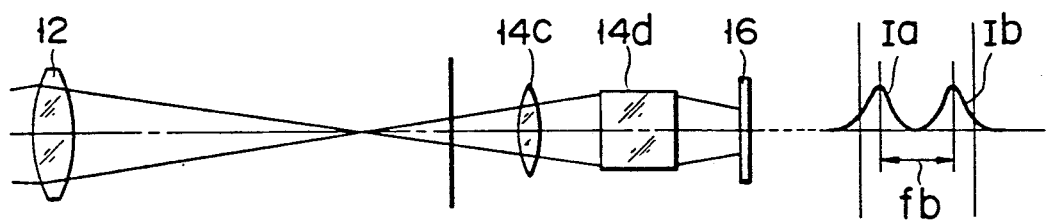
F I G. 3B
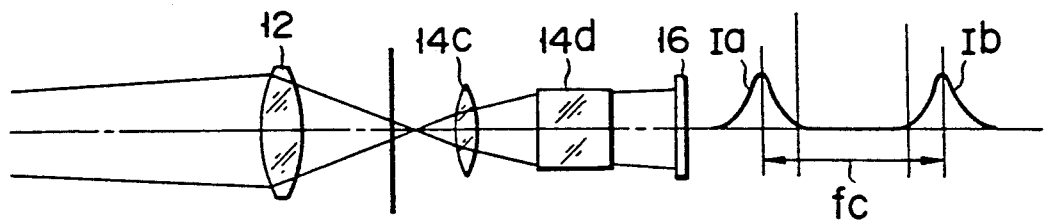
F I G. 3C

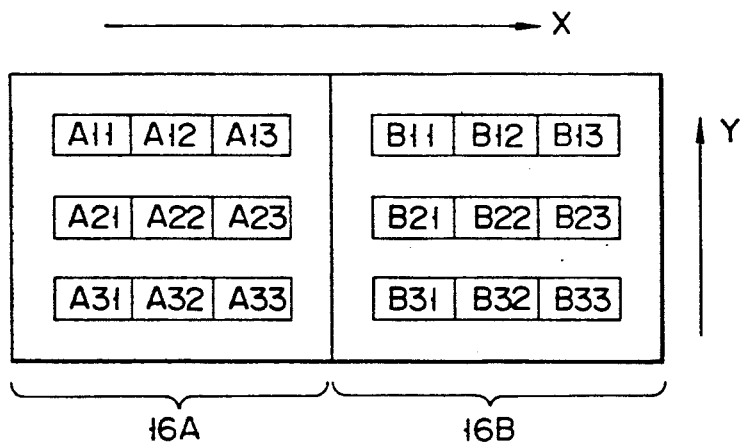
FIG. 4
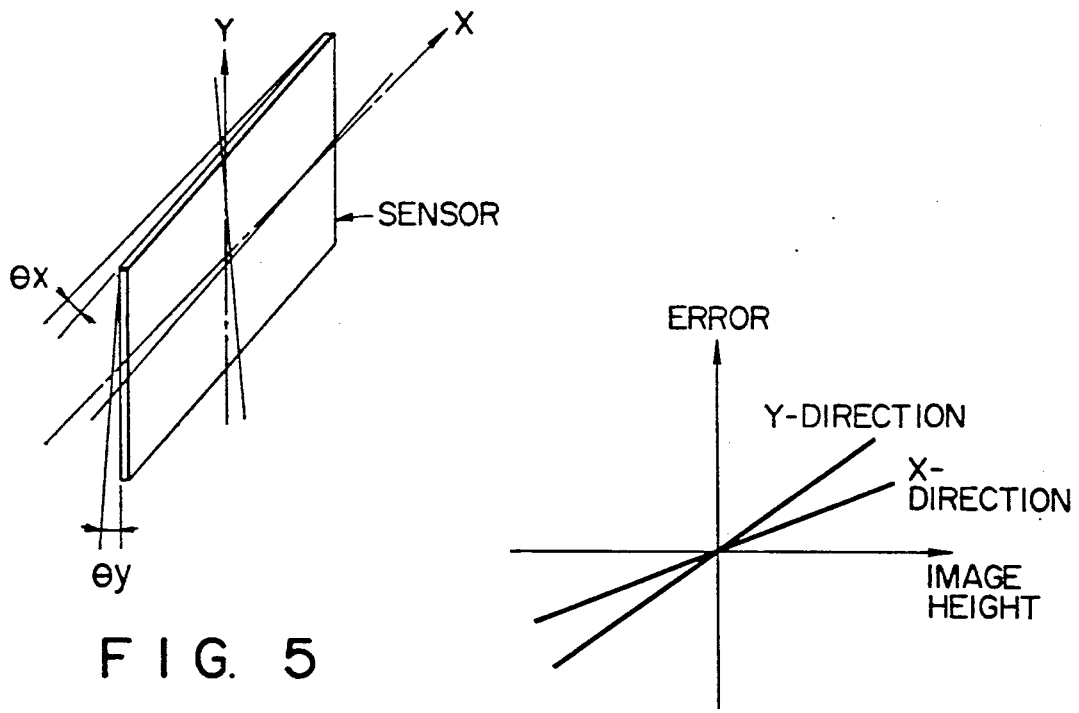
FIG. 5
FIG. 6

CAMERA FOCUS DETECTOR

BACKGROUND OF THE INVENTION

1. Field of the Invention

The present invention relates to a focus detector, and more particularly to a focus detector incorporated in an automatic focusing camera which has a plurality of focus-detecting regions. The present invention detects how a subject image is shifted from a reference position, and drives a photographing lens to a focusing position in accordance with the detection.

2. Description of the Related Art

Published Unexamined Japanese Patent Application No. 63-172209 discloses an automatic focus detector which is to be incorporated in an automatic focusing camera having a plurality of focus-detecting regions. In this automatic focus detector, a shift in the direction of the optical axis is corrected independently in each of the focus-detecting regions, such that focus detection can be performed with high accuracy even if a dimensional error in the direction of the optical axis exists between each light-receiving system and the optical system. More specifically, signals DTA to DTC output from the light-receiving systems are supplied to a first calculation section, by which the degrees of defocusing $\Delta \epsilon_A$, $\Delta \epsilon_B$ and $\Delta \epsilon_C$ are calculated. A second calculation section corrects these defocusing degrees as $(\Delta \epsilon_A + \Delta \epsilon_{AZ})$, $(\Delta \epsilon_B + \Delta \epsilon_{BZ})$ and $(\Delta \epsilon_C + \Delta \epsilon_{CZ})$, on the basis of the data which represents shifting degrees $\Delta \epsilon_{AZ}$, $\Delta \epsilon_{BZ}$ and $\Delta \epsilon_{CZ}$ detected in the direction of the optical axis, which data is stored in a memory beforehand. In this manner, a shifting degree in the direction of the optical axis is corrected independently with respect to each light-receiving system.

According to the publication, however, a shifting degree in the direction of the optical axis is corrected independently with respect to each focus-detecting region. This being so, the number of steps required for storing data on the shifting degrees will increase with an increase in the number of focus-detecting regions. In addition, a ROM having a larger storage capacity has to be employed. As a result, the manufacturing cost of the focus detector is inevitably high.

SUMMARY OF THE INVENTION

Accordingly, an object of the present invention is to provide a camera focus detector wherein data on a shifting degree (the distance between two images) obtained in an in-focus state is stored with respect to a few focus-detecting regions even in the case where the number of focus-detecting regions is large, and wherein, with respect to focus-detecting regions whose data regarding shifting degrees is not stored, correction is performed on the basis of the stored data on shifting degrees. The present invention therefore obtains an accurate focus-detecting signal, with no need to make fine mechanical adjustment or to employ a ROM having a large storage capacity.

According to an aspect of the present invention, there is provided a phase difference-detection type focus detector, wherein a light beam carrying a subject image is formed on a focus-detection plane after pupil division, and the distance between two images formed on the focus-detecting plane is measured, so as to detect the distance by which the photographing lens is located away from the focusing position. The focus detector comprises a pair of area image sensors, arranged in the focus-detection plane, for photoelectrically converting the two images, each of the area image sensors including a plurality of blocks corresponding to regions of a photographic frame; means for deriving data on the degree of defocusing with respect to arbitrary regions of the photographic frame from photoelectrically-converted signals output from the blocks; memory means for storing data on the degree of defocusing with respect to at least three regions of the photographic frame; and means for correcting the degree of defocusing on the basis of the data stored in the memory means with respect to the blocks whose data on the degree of defocusing is recorded, and for correcting the degree of defocusing, with respect to blocks whose data on the degree of defocusing is not stored in the memory, on the basis of data which is obtained by determining an imaginary plane by use of the data stored in the memory means and by executing interpolation.

According to another aspect of the present invention, there is provided a camera focus detector comprising: light beam-dividing means for dividing a light beam which has passed through a photographing optical system into a first light beam and a second light beam; an area-type photoelectric converting element for receiving the first and second light beams and outputting image pattern signals; memory means for storing data on the distance between an image corresponding to an image pattern of the first light beam and an image corresponding to an image pattern of the second light beam in regard to predetermined positions in an area of the photoelectric converting element when the photographing optical system is in an in-focus state or in a predetermined out-of-focus state; correction means for performing correction with respect to an image-to-image distance corresponding to arbitrary regions of the area-type photoelectric converting element; and calculation means for outputting a focus-detecting signal on the basis of the corrected image-to-image distance and of the distance between the image pattern corresponding to the first light beam and the image pattern corresponding to the second light beam.

Another object of the present invention is to provide a camera focus detector, comprising: an area-type photoelectric converting element for receiving light beams corresponding to a plurality of regions of a photographic frame and outputting photoelectrically-converted signals corresponding to the light beams; memory means for storing correction coefficient data in accordance with only predetermined positions in an area of the photoelectric converting element when a photographing lens is in an in-focus state or a predetermined out-of-focus state, the correction coefficient data being used for changing the photoelectrically-converted signals into distance-related signals; interpolation means for performing interpolation by use of the correction coefficient data stored in the memory means, so as to obtain correction coefficients corresponding to arbitrary regions of the area-type photoelectric converting element; and calculating means for outputting a focus-detecting signal on the basis of the photoelectrically-converted signals corresponding to a given region of the area-type photoelectric converting element and of the correction coefficients obtained by the interpolation.

Still another object of the present invention is to provide a focus detector comprising: means for detecting the degree of defocusing with respect to a plurality of regions of a photographic frame; means for storing correction data on the degree of defocusing regarding at least three regions when a photographing lens is located at a predetermined position; and means for correcting the degree of defocusing by use of the correction data with respect to the region whose correction data is stored in the storing means, and for correcting the degree of defocusing by use of correction data derived from the correction data stored in the storing means, with respect to regions whose correction data is not stored in the storing means.

According to still another aspect of the present invention, there is provided a camera focus detector comprising: means for detecting the degree of defocusing with respect to a plurality of regions of a photographic frame; means for outputting correction data which is used for correcting a focus detection error with respect to the degree of defocusing of a given one of the regions of the photographic frame; means for processing the correction data on the basis of a positional relationship determined with reference to the given region, with respect to the degree of defocusing of regions, other than the given region, and for outputting the processed correction data; and means for correcting the degree of defocusing by using the correction data in relation to the given region and for correcting the degree of defocusing by using processed correction data in relation to regions other than the given region.

A further object of the present invention is to provide a method for storing data on an image-to-image distance, the method being employed by a camera focus detector which is of a type comprising: light beam-dividing means for dividing a light beam which has passed through a photographing optical system into a first light beam and a second light beam; an area-type photoelectric converting element for receiving the first and second light beams and outputting image pattern signals; and calculation means for outputting a focus-detecting signal on the basis of the distance between a first image pattern corresponding to the first light beam and a second image pattern corresponding to the second light beam, the method comprising the steps of: mechanically correcting the degree of rotation in an XY plane and the degrees of shifting in X- and Y-directions; projecting a pattern having different shades in the X-direction on the photoelectric converting element; selecting at least three regions and causing the calculation means to calculate the degree of shifting in relation to each of the selected regions; and writing data on the calculated degree of shifting in a nonvolatile memory.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic block circuit diagram showing the structure of an automatic focusing camera which employs a focus detector according to the present invention;

FIG. 2 shows, in detail, how optical elements are arranged in the focus-detecting optical system shown in FIG. 1;

FIGS. 3A, 3B and 3C show an optical system, and two images which a light beam passing through the optical system forms on a sensor, FIG. 3A corresponding to the case where a film plane is at a focal point, FIG. 3B corresponding to the case where the film plane is located on the rear side of the focal point, and FIG. 3C corresponding to the case where the film plane is located on the front side of the focal point;

FIG. 4 is a plan view of an area image sensor;

FIG. 5 is a perspective view showing how the area image sensor is tilted with reference to an X-Y plane perpendicular to the main optical axis;

FIG. 6 is a graph showing how an image height error is caused in relation to the tilt of the sensor;

DETAILED DESCRIPTION OF THE PREFERRED EMBODIMENTS

Figure 7:
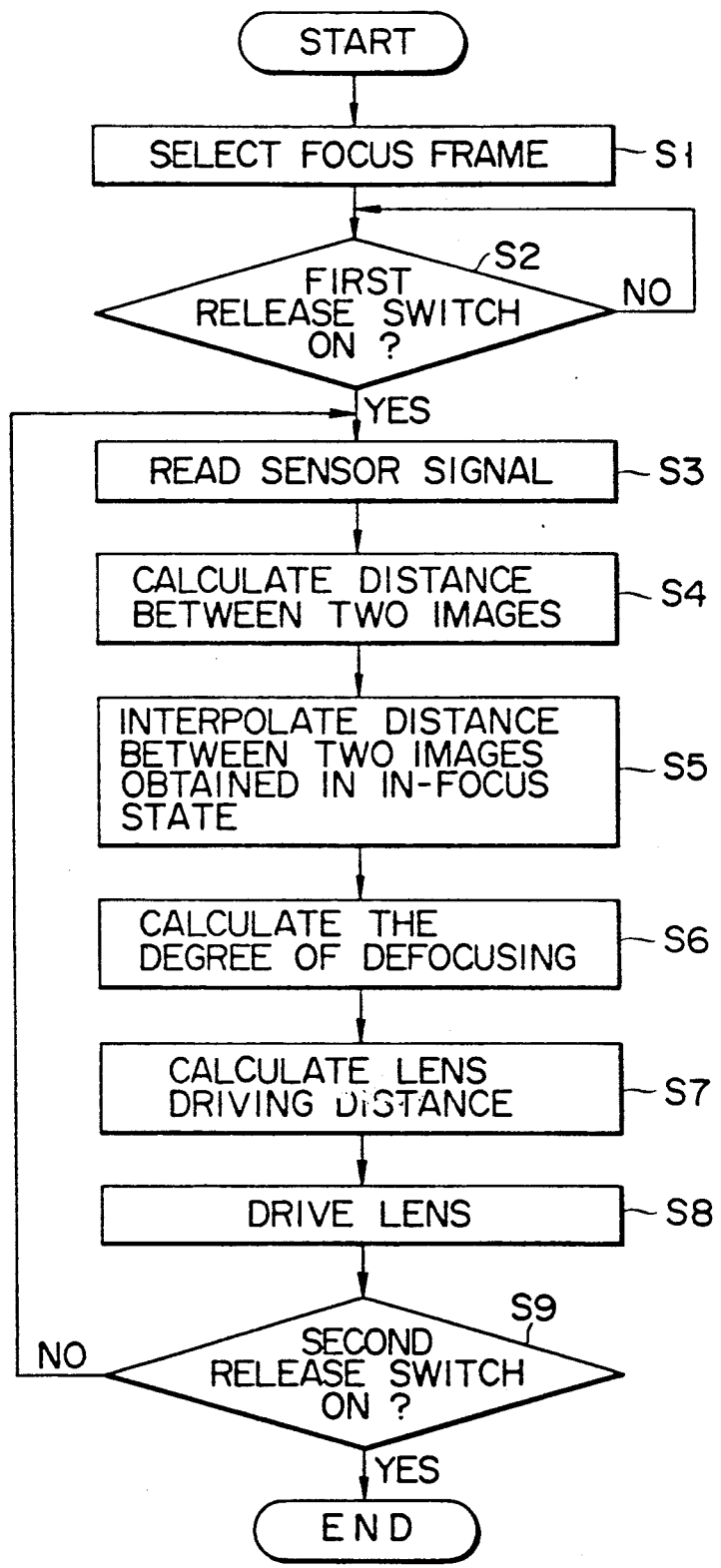
FIG. 7 is a flowchart explaining a focus-detecting operation.

One embodiment of the present invention will now be described, with reference to the accompanying drawings.

FIG. 1 is a schematic block circuit diagram showing the structure of an automatic focusing (AF) camera which employs a focus detector according to the present invention. As is shown in FIG. 1, the camera comprises a photographing lens 12, a focus-detecting optical system 14, an area image sensor 16, an interface circuit 18, a CPU (a central processing unit) 20, a ROM (a read-only memory) 22, a lens ROM 24, a lens-driving circuit 26, a lens-driving motor 28, a slit 30, a light-emitting diode 32 (which constitutes a photo-interrupter), a phototransistor 34, a display device 36, a focus frame-setting device 38, etc. Reference numerals "SW1" and "SW2" in FIG. 1 denote first and second release switches, respectively, both being used for starting an automatic focusing operation (hereinafter referred to as. an AF operation).

The sensor 16 photoelectrically converts an image formed by the focus-detecting optical system 14 into an electric signal (an image signal). The interface circuit 18 drives the sensor 16. It also converts the electric signal (i.e., an analog signal) output from the sensor 16 into a digital signal and supplies this digital signal to the CPU 20. The CPU 20 executes the control of the entire camera. For example, it determines the distance to a subject on the basis of the output of the sensor 16, and controls the display device 26 to indicate states of the camera, such as the in-focus and out-of-focus states of the camera.

The ROM 22 stores data on the degree of shifting (i.e., the distance between an image-to-image distance) which is obtained in the in-focus state for a plurality of focus-detecting regions. The lens ROM 24 is incorporated in a lens barrel. It stores data on e.g., conversion coefficients used for deriving the degree of defocusing from the degree of image shifting and the F number of the lens. It also stores data of various kinds necessary for the focus detection. The lens-driving circuit 26 drives the motor 28 under the control of the CPU 20, so as to move the photographing lens to its optimal position. The focus frame-setting device 38 is used for selecting a block (which is a so-called focus frame), such that the image in the finder of the camera can be brought into focus.

In an AF operation, the distance to a subject is first determined, and then the photographing lens 12 is driven on the basis of the distance. The data on the distance for which the lens 12 is driven has to be fed back to the CPU 20. In general, the distance for which the lens 12 is actually driven is represented by the number of rotations of the driving motor 28. In the case of the embodiment, the photo-interrupter counts how many times the slit 30 is rotated. More specifically, when the lens-driving circuit 26 is actuated and the motor 28 rotated, the slit 30 formed in the rotary member of the lens barrel and having a uniform gap is rotated. Since, during this rotation, the slit 30 passes through the region between the light-emitting diode 32 and the phototransistor 34, the number of rotations which the slit 30 makes can be counted by the CPU 20, when the count indicating the number of rotations of the slit 30 has reached the predetermined value, the rotation of the motor 28 is stopped.

FIG. 2 shows, in detail, how optical elements are arranged in the focus-detecting optical system 14 illustrated in FIG. 1. As is shown in FIG. 2, the focus-detecting optical system 14 comprises: a quick return mirror 14a which is movable in the direction of arrow M; a prism 14b; a field lens 14c; and a visual field image-transmitting optical system 14d which is made up of an aperture controller $14_1$, an optical axis-tilting prism $14_2$, etc. During the AF operation, the quick return mirror 14a directs a light beam (which represents image information) coming from the photographing lens 12 to the prism 14b. When a picture is taken, the quick return mirror 14a directs that light beam to a film plane 14e. The visual field image-transmitting device 14d splits the light beam directed thereto into two light beams by pupil division, and forms two images Ia and Ib on the sensor 16.

A description will now be given of the principles underlying the focus detection performed in the present invention. The present invention employs a so-called phase difference system, wherein the distance to a subject is determined on the basis of the distance between two images Ia and Ib obtained by pupil division.

After a light beam coming from the photographing lens 12 passes through field lens 14c, it enters the visual field image-transmitting optical system 14d. The light beam is divided by this optical system 14d, and images Ia and Ib are formed on the area image sensor 16. In the in-focus state wherein the light beam is focused on the film plane, the two images Ia and Ib formed on the area image sensor 16 are located away from each other by a certain distance fa, irrespective of the distance to the subject, as is shown in FIG. 3A. If the light beam is focused on the front side of the film plane, the distance fb between the image images Ia and Ib is shorter than the distance fa of the in-focus state (fa > fb), as is shown in FIG. 3B. Conversely, if the light beam is focused on the rear side of the film plane, the distance fc between the image images Ia and Ib is longer than the distance fa of the in-focus state (fa < fc), as is shown in FIG. 3C. Therefore, the distance to the subject can be determined on the basis of the distance between the two images Ia and Ib.

FIG. 4 is a plan view of the area image sensor 16. This area image sensor 16 is made up of a pair of image screens 16A and 16b, on each of which an image of the subject is projected. Assume that each image screen is divided into nine areas (A11, A12, A13, A21, A22, A23, A31, A32, A33; and B11, B12, B13, B21, B22, B23, B31, B32, B33) and that the subject whose image is formed on areas A11 and B11 is to be brought into focus. In this case, the photoelectrically-converted signals corresponding to areas A11 and B11 are subjected to calculation based on a predetermined algorithm, so as to detect the distance between the two images formed on areas A11 and B11. Since the degree of shifting is obtained in relation to the detected distance, the degree of defocusing can be obtained. The processing needed for the calculation is disclosed in Published Unexamined Japanese Patent Application No. 63-73210, so that reference to the calculation processing will be omitted herein. In FIG. 4, the degree of shifting ($A_{mn}$, $B_{mn}$) between two images is calculated with respect only to selected blocks (areas).

The detection accuracy of the above-mentioned AF sensor module is likely to be adversely affected by various factors. Broadly speaking, these factors may be classified as follows:

(1) factors arising from the design, working, assembly and adjustment of optical members;

(2) factors arising from the transmission circuits, such as a sensor and an interface; and (3) factors arising from the algorithm.

In the present invention, it is intended that the detection accuracy be improved by eliminating the adverse effects caused by the factors classified as group (1) above. The factors classified as group (1) include an image height error and a rotation error. The image height error is a focus detection error caused by a positional change of a subject in a photographic frame. The image height error is attributable to, for example, the aberration, the tilting of a lens, the tilting of the area image sensor 16 with reference to the plane perpendicular to the main optical axis, and the non-uniform illuminance distribution due to the COS fourth-power rule (which are caused by the field lens and the visual field image-transmitting system 14d [FIGS. 2 and 3A–3C]).

If the size of the focus-detecting region is increased, a tilt of the area image sensor with reference to the plane perpendicular to the main optical axis becomes a problem. This problem will be described below.

FIG. 5 is a perspective view showing how the area image sensor tilts with reference to an X-Y plane perpendicular to the main optical axis, and FIG. 6 is a graph showing how an image height error is caused in relation to the tilt of the sensor.

Let it be assumed that the area image sensor 16 is tilted by $\theta x$ in the X-direction and is also tilted by $\theta y$ in the Y-direction, as is indicated in FIG. 5. In this case, the image height error will increase substantially in proportion to the image height, as is shown in FIG. 6. This error may be corrected by taking the following measures:

(i) to make mechanical adjustment; or (ii) to calculate the degrees of shifting corresponding to all focus-detecting regions in the in-focus state, and write data on the degrees of shifting in a ROM.

Measure (i) is difficult in practice since the mechanical adjustment requires accuracy in the order of several seconds or less. Measure (ii) is also difficult in practice since the ROM is required to have a considerably large storage capacity if the number of focus-detecting regions is large. In addition, a large number of steps are needed to store data on the degree of shifting corresponding to all the focus-detecting regions.

According to the present invention, predetermined focus-detecting regions are selected. For example, areas which are located at the four corners of the two image screens, namely areas (A11, B11), (A13, B13), (A31, B31) and (A33, B33), are selected from the areas shown in FIG. 4. With respect to these selected areas, the degrees of shifting in the in-focus state (i.e., the image-to-image distances $\theta_{11}$, $\theta_{13}$, $\theta_{31}$ and $\theta_{33}$) are calculated. As for the other areas, the degrees of shifting in the in-focus state are obtained by interpolating the degrees of shifting calculated with respect to the selected area.

The point of the present invention will be explained in more detail, with reference to the flowchart shown in FIG. 7.

First, in step S1, predetermined focus frames are selected by the focus frame-setting device 38, so as to adjust the focus in the photographic frame. For example, areas (A21, B21) are selected from the areas shown in FIG. 4. Since the focus frames are displayed by the display device 36, the photographer can easily recognize which areas in the photographic frame are selected. Next, the photographer turns on the first release switch SW1 in step S2. In response to this, an AF operation is started. That is, signals are generated from the sensor 16 in step S3, and data is stored in the RAM of the CPU 20. Subsequently, in step S4, the image-to-image distance which is obtained in the in-focus state in regard to the selected areas is calculated in accordance with a predetermined algorithm. That is, the image-to-image distance $\theta_{21}$ in the in-focus state in regard to areas (A21, B21) is calculated as follows:

$$\delta_{21} = (\delta_{11} + \delta_{31})/2 \tag{1}$$

Likewise the image-to-image distances and $\delta_{22}$ are calculated by interpolation as below, in regard to areas (A12, B12) and (A22, B22).

$$\delta_{12} = (\delta_{11} + \delta_{13})/2 \tag{2}$$

$$\delta_{22} = (\delta_{11} + \delta_{33})/2 \tag{3}$$

The image-to-image distances can be calculated by interpolation in the above manner, even if the number of regions divided from the focus-detecting region is increased. In this manner, the interpolation operation of the image-to-image distance $\delta_0$ is performed (step S5).

Let it be assumed that $\delta$ is the degree of shifting in the defocusing state and $\delta_0$ is the degree of shifting in the in-focus state obtained as above. In this case, the degree $\Delta$ of defocusing, which represents the distance between the focal point of the photographing lens 12 and the position of the film plane, is given by:

$$\Delta = \frac{k_2(\delta - \delta_0)}{(\delta - \delta_0) + k_1} \tag{4}$$

where $k_1$ and $k_2$ are values determined by the manner in which the optical members of the focus-detecting optical system are arranged.

The degree $\Delta$ of defocusing is calculated according to formula (4) in step S6. Therefore, the distance L by which the photographing lens 12 should be driven is given by:

$$L = \epsilon \Delta \tag{5}$$

where $\epsilon$ is a value dependent on the type of lens and the degree $\Delta$ of defocusing (it is obtained from a table prepared beforehand).

After the lens-driving distance L is obtained according to formula (5) in step S7, the photographing lens 12 driven for the distance L in step S8. Then, a check is made in step S9 to see whether or not the second release switch SW2 has been turned on by the photographer. If the second release switch SW2 is not on, then the flow returns to step S3 and steps S3-S8 are repeated. If the second release switch SW2 is on, the operation based on steps S1-S9 is brought to an end.

The above description was given, referring to the case where the ROM stores data representing the degrees of shifting obtained in the in-focus state. However, the present invention is in no way limited to this. For example, the degrees of shifting may be obtained when the degree $\Delta$ of defocusing satisfies a predetermined condition. From such degrees of shifting, the degrees of shifting in the in-focus state can be derived.

A description will now given as to how a rotation error is suppressed. The rotation error is produced if the line passing between the centers of the two optical axis-tilting prisms 14$_2$ (FIG 2) is slanted with reference to the area image sensor 16. In the case where the angle by which the line is slanted with reference to the area image sensor 16 is denoted by $\theta$, the degree of shifting $\delta_1$ in the vertical direction with reference to a rectangular chart and the degree of shifting $\delta_2$ with reference to a chart which is tilted by $\alpha$ with reference to the vertical direction, have the relationships given by:

$$\tan\theta = \frac{\delta_1 - \delta_2}{\delta_2} \tan\alpha \tag{6}$$

From formula (6), angle $\theta$ is obtained, and the area image sensor 16 is rotated by this angle, for the elimination of the rotation error.

Figure 8:
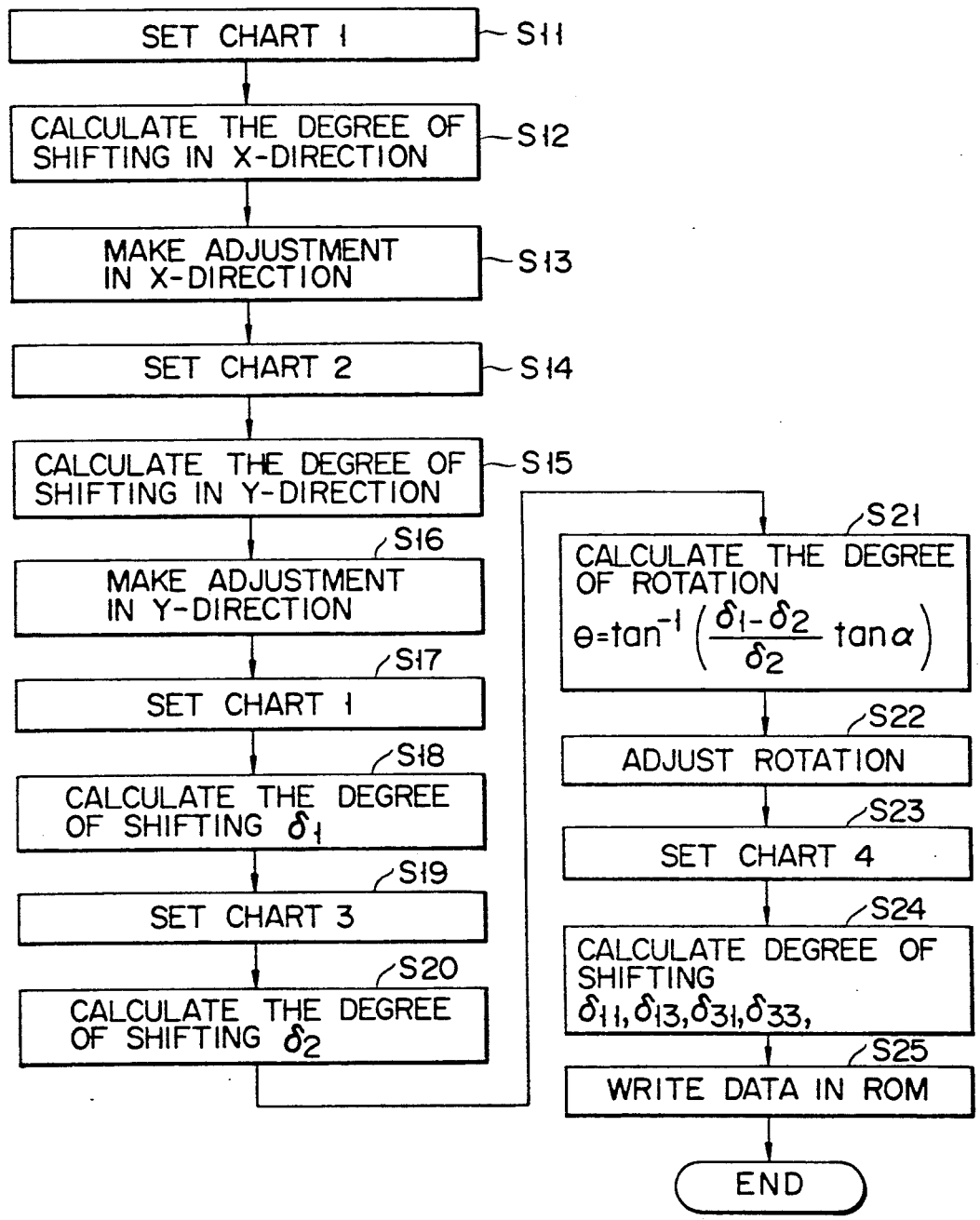
FIG. 8 is a flowchart explaining the adjustment made in the assembly of a module.

The adjustment to be made in the assembly of the sensor module will be described, with reference to the flowchart shown in FIG. 8.

Figure 9A:
FIGS. 9A-9D are plan views illustrating charts used in the adjustment shown in FIG. 8.
Figure 10:
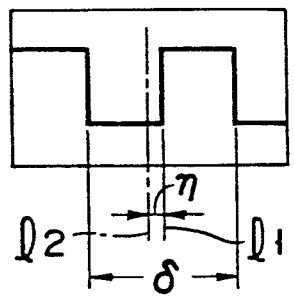
FIGS. 10 and 11 show the degrees of shifting which are referred to in the flowchart shown in FIG. 8 and which occur in the X and Y directions.

First of all, chart 1 shown in FIG. 9A is set at a predetermined position in step S11. Then, the degree of shifting in the X-direction is calculated in step S12. The degree of shifting calculated in step S12 represents how the sensor 16 shown in FIG. 5 is shifted in the X-direction from the optically-central axis of the element. As is shown in FIG. 10, it corresponds to the distance $\eta$ by which the center $l_1$ between the two images and the center $l_2$ of the sensor 16 are shifted from each other. In step S13, therefore, the position of chart 1 is mechanically adjusted by $\eta$ in the X-direction, to eliminate the shifting in the X-direction.

Figure 9C:
Figure 9B:
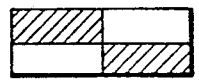
Figure 11:
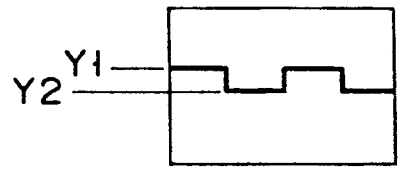

In step S14, chart 2 shown in FIG. 9B is set, and in step S15, the degree of shifting in the Y-direction is calculated. If the shifting in the Y-direction is left as it is, the level of the signal output from the sensor does not become constant, as is indicated by Y1 and Y2 in FIG. 11. Therefore, the position of chart 2 is adjusted in the Y-direction in step S16. The distance by which chart 2 is adjusted is given by:

$$\Delta Y = K(Y_1 - Y_2) \tag{7}$$

where K is a constant.

Thereafter, the flow advances to step S17, wherein chart 1 shown in FIG. 9A is set once again. Subsequently, in step S18, the degree of shifting $\delta_1$ is calculated.

Chart 3 shown in FIG. 9C is set in step S19, and the degree of shifting $\delta_2$ is calculated in step S20. After this, the rotation error is calculated in step S21, on the basis of the following formula:

$$\theta = \tan^{-1}\left(\frac{\delta_1 - \delta_2}{\delta_2} \tan\alpha\right) \tag{8}$$

After the calculation of the rotation error, the flow advances to step S22, wherein the adjustment of rotation is made by angle $\theta$. The above adjustments are carried out by use of outputs from the sensor arranged in the center of the photographic frame.

Figure 9D:
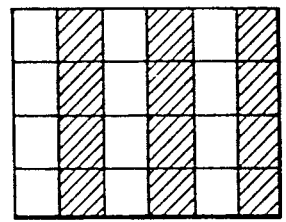

In step S23, chart 4 shown in FIG. 9D, which covers a wider area than the charts 1-3 shown in FIG. 9A-9C, is set. Subsequently, in step S24, the degrees of shifting $\delta_{11}$, $\delta_{13}$, $\delta_{31}$ and $\delta_{33}$ are calculated with respect to areas (A11, B11), (A13, B13), (A31, B31) and (A33, B33) shown in FIG. 4. Data on these degrees of shifting $\delta_{11}$, $\delta_{13}$, $\delta_{31}$ and $\delta_{33}$ is written in a ROM, such as a nonvolatile E$^2$PROM. In this manner, the fabrication and adjustment of the sensor module are completed.

As has been described, the present invention can provide a camera focus detector wherein data on a shifting degree obtained in an in-focus state is stored with respect to a few focus-detecting regions even in the case where the number of focus-detecting regions is large, and wherein, with respect to the other focus-detecting regions, correction is performed on the basis of the stored data on shifting degrees, so as to obtain an accurate focus-detecting signal with no need to make fine mechanical adjustment or to employ a ROM having a large storage capacity.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A phase difference-detection type focus detector, wherein a light beam carrying a subject image is split into two by pupil division and wherein two images are formed on a focus-detection plane and a distance therebetween is measured, for detecting a distance by which a photographing lens is located away from a focusing position, said focus detector comprising:
    a pair of area image sensors, having a plurality of blocks and being arranged in the focus-detection plane, for photo-electrically converting the two images formed thereon into output signals, each of said plurality of blocks corresponding to a respective one of a plurality of regions of a photographic frame;
    derivation means for deriving from said output signals data on a degree of defocusing with respect to each of said regions of the photographic frame and for outputting said data;
    memory means for storing said data on a degree of defocusing with respect to a given number of said regions of the photographic frame, said given number being greater than three but less than the total number of said regions of the photographic frame;
    correction means for correcting the degree of defocusing on the basis of said data stored in said memory means, and on the basis of data which is obtained by determining an imaginary plane using said data stored in said memory means and by executing interpolation with respect to regions of the photographic frame on which data on a degree of defocusing is not stored in said memory means.

2. An apparatus according to claim 1, wherein said given number of regions on which data on a degree of defocusing is stored in said memory means are regions located at corners of each said area image sensor.

3. A camera focus detector, comprising:
    light beam dividing means for dividing a light beam which has passed through a photographing optical system into a first light beam and a second light beam;
    an area-type photoelectric converting element for receiving said first and second light beams and for outputting image pattern signals;
    memory means for storing, with respect to a given number of regions within said area-type photoelectric converting element, data on a distance between an image corresponding to an image pattern of said first light beam and an image corresponding to an image pattern of said second light beam when said photographing optical system is in an in-focus state or in a predetermined defocusing state, said given number of regions being less than the total number of said regions within said area-type photoelectric converting element;
    correction means for correcting an image-to-image distance with respect to arbitrary regions within said area-type photoelectric converting element on which data has not been stored by using said data stored in said memory means; and
    calculation means for outputting a focus-detecting signal on the basis of said corrected image-to-image distance and on the basis of said data stored in said memory means.

4. A camera focus detector according to claim 3, wherein said correction means corrects said image-to-image distance with respect to arbitrary regions within said area-type photoelectric converting element by using said data stored in said memory means which corresponds to regions located in the neighborhood of said arbitrary regions.

5. A camera focus detector according to claim 3, further comprising a driving means for driving said photographing optical system in accordance with said focus-detecting signal output by said calculation means.

6. A camera focus detector according to claim 3, wherein said given number of regions with respect to which data is stored in said memory means are at least three in number.

7. A camera focus detector comprising:
    an area-type photoelectric converging element for receiving light beams corresponding to a plurality of regions of a photographic frame and for outputting photoelectrically-converted signals corresponding to the light beams;
    memory means for storing correction coefficient data corresponding to a given number of said regions of the photographic frame when a photographing lens is in an in-focus state or a predetermined out-of-focus state, said correction coefficient data being used to transform the photoelectrically-converted signals into distance-related signals;

interpolation means for obtaining correction coefficients corresponding to arbitrary regions of the photographic frame on which data has not been stored, by interpolation using said correction coefficient data stored in said memory means; and calculating means for outputting a focus-detecting signal on the basis of the distance-related signals corresponding to said given number of regions of the photographic frame and on the basis of the correction coefficients obtained by the interpolation performed by the interpolation means.

8. A camera focus detector according to claim 7, wherein a light beam passing through a photographing optical system is divided by light beam-dividing means into first and second light beams, said area-type photoelectric converting element receiving the first and second light beams and outputting image pattern signals corresponding to the first and second light beams, said correction coefficient data corresponding to a distance by which image patterns corresponding to the first and second light beams are away from each other when the photographing optical system is in an in-focus state.

9. A camera focus detector according to claim 7, wherein said memory means projects a predetermined chart pattern on the area-type photoelectric converting element when the in-focus state of the photographing optical system has a predetermined relationship with a letting state of the photographing optical system, and wherein said memory means detects in said given number of regions a pattern distance obtained by means of the chart pattern and stores the pattern distance data in association with corresponding regions.

10. A camera focus detector according to claim 7, wherein said given number of regions with respect to which said memory means stores data are at least three in number.

11. A focus detector comprising:

detecting means for detecting a degree of defocusing with respect to a plurality of regions of a photographic frame;

storing means for storing correction data on a degree of defocusing with respect to a given number of said regions of the photographic frame when a photographing lens is located at a predetermined position, said given number being greater than three but less than the total number of said regions of the photographic frame; and correction means for correcting the degree of defocusing by use of the correction data stored in said storing means with respect to said given number of regions, and for correcting the degree of defocusing by use of correction data derived from said correction data stored in said storing means with respect to regions of the photographic frame on which data on a degree of defocusing is not stored in said storing means.

12. A focus detector according to claim 11, wherein said detecting means includes:

an optical system for splitting an image-carrying light beam by pupil-division and for forming images on a focus-detection plane;

a pair of area image sensors, having a plurality of blocks and being arranged in the focus-detection plane, for photoelectrically converting the images formed by said optical system into output signals, each of said plurality of blocks corresponding to a respective one of a plurality of regions of a photographic frame; and derivation means for deriving data on a degree of defocusing with respect to each of said regions of the photographic frame by measuring an image-to-image distance corresponding to the regions on the basis of the output signals.

13. A focus detector according to claim 11, wherein said correction data represents a degree of defocusing obtained when the photographing lens is in an in-focus state.

14. A focus detector according to claim 11, wherein said correction data is derived from a degree of defocusing obtained when the photographing lens is located at an arbitrary position, and wherein said correction data represents a degree of defocusing obtained when the photographing lens is in an in-focus state.

15. A focus detector comprising:

detection means for detecting a degree of defocusing with respect to a plurality of regions of a photographic frame;

output means for outputting correction data which is used for correcting a focus detection error with respect to a degree of defocusing of a given one of the regions of the photographic frame;

processing means for processing the correction data with respect to a degree of defocusing of regions other than the given region on the basis of a positional relationship determined with reference to the given region, and for outputting the processed correction data; and correction means for correcting the degree of defocusing by using the correction data in relation to the given region, and for correction the degree of defocusing by using the processed correction data in relation to regions other than the given region.

16. A method for storing data on an image-to-image distance, said method being carried out by a camera focus detector which comprises: a light beam-dividing means for dividing a light beam which has passed through a photographing optical system into a first light beam and a second light beam; an area-type photoelectric converting element for receiving the first and second light beams and for outputting image pattern signals; and calculation means for outputting a focus-detecting signal on the basis of the distance between an image pattern corresponding to the first light beam and an image pattern corresponding to the second light beam, said method comprising the steps of:

mechanically correcting a degree of rotation in an XY plane and degrees of shifting in X- and Y-directions;

projecting a pattern having different shades in the X-direction on the photoelectric converting element;

selecting a given number of regions of the photoelectric converting element and causing the calculation means to calculate the degree of shifting in relation to each of the selected regions, said given number being greater than three and less than the total number of regions of the photoelectric converting element;

writing data on the calculated degree of shifting in relation to each of the selected regions in a nonvolatile memory; and outputting a focus-detecting signal on the basis of said data written in said memory and on the basis of data obtained with respect to non-selected regions of the photoelectric converting element by using said data written in said memory.

* * * * *